United States Patent [19]

Bishop

[11] Patent Number: 5,174,245
[45] Date of Patent: Dec. 29, 1992

[54] ANIMAL WATERER DRINKING WELL APPARATUS

[75] Inventor: Warren E. Bishop, Conrad, Iowa

[73] Assignee: Ritchie Industries, Inc., Conrad, Iowa

[21] Appl. No.: 822,922

[22] Filed: Jan. 21, 1992

[51] Int. Cl.$^5$ .............................................. A01K 7/00
[52] U.S. Cl. ..................................................... 119/73
[58] Field of Search ...................... 119/73, 74, 78, 79, 119/80

[56] References Cited

U.S. PATENT DOCUMENTS

| 443,446 | 12/1890 | Kouns | 119/79 |
|---|---|---|---|
| 1,474,530 | 11/1923 | Kirby | 119/73 |
| 1,535,165 | 4/1925 | Koerperich et al. | |
| 2,589,427 | 3/1952 | Ossmann | |
| 2,796,312 | 6/1957 | Townsend | |
| 3,745,977 | 7/1973 | Martin | |
| 4,559,905 | 12/1985 | Ahrens | |
| 4,576,118 | 4/1986 | Meadows | |
| 4,646,687 | 3/1987 | Peterson et al. | |
| 4,739,727 | 4/1988 | Boyer | |
| 4,856,459 | 8/1989 | Wiseman et al. | 119/73 |
| 4,922,858 | 5/1990 | Ahrens | |

OTHER PUBLICATIONS

Copy-3 pages of Ritchie Waterer brochure published in 1991.

Primary Examiner—Gene Mancene
Assistant Examiner—Todd E. Manahan
Attorney, Agent, or Firm—Henderson & Sturm

[57] ABSTRACT

An animal waterer drinking well apparatus is utilized with an animal waterer having a cover with one or more circular openings formed therein. The apparatus comprises a circular drinking well having an outwardly extending lip at the upper end thereof and which is adaptable to be inserted into one of the openings. A plurality of slots are formed in arcuately spaced relation in the circular wall of the well slightly below the lip, and a flexible ring having arcuately spaced projections, is inserted into the slots. The projections combine with the lip to embrace circumferential portions of the cover about the opening and secure the well to the cover. An annular, inwardly extended collar is formed integral with the well and is spaced below the arcuately spaced slots; and a circular float having a diameter slightly less than the inner diameter of the well is adapted to seat upwardly against the collar due to water pressure within the well below the float to form a seal.

8 Claims, 2 Drawing Sheets

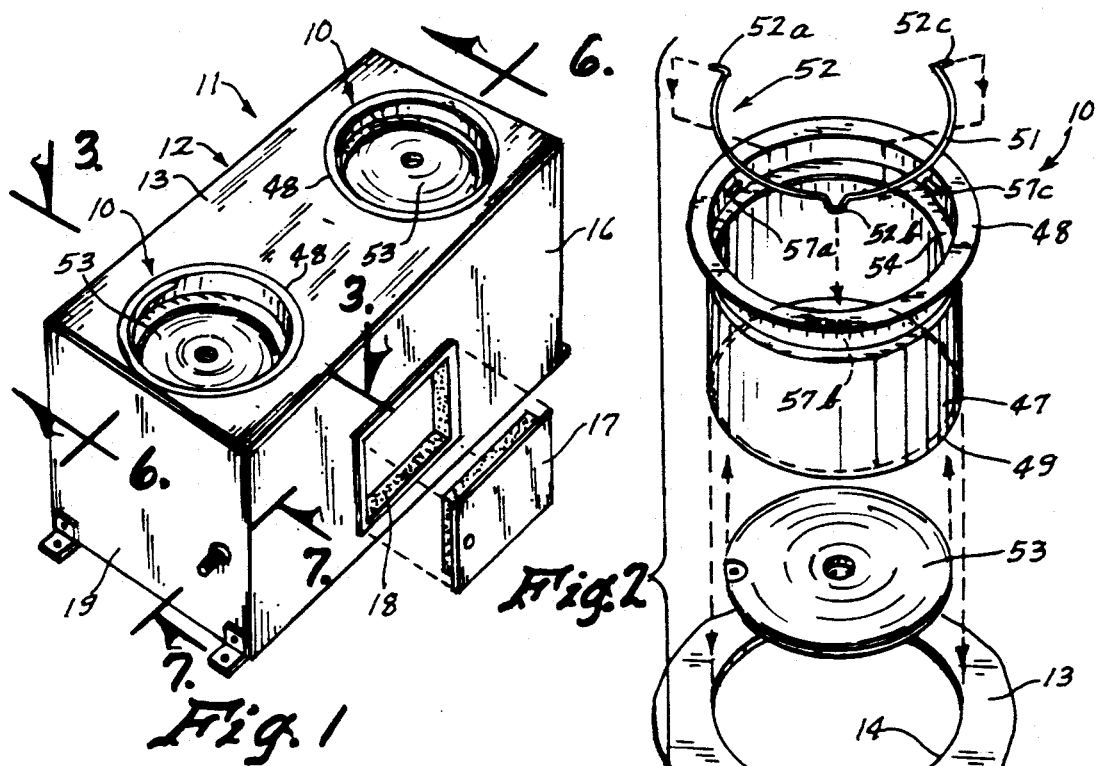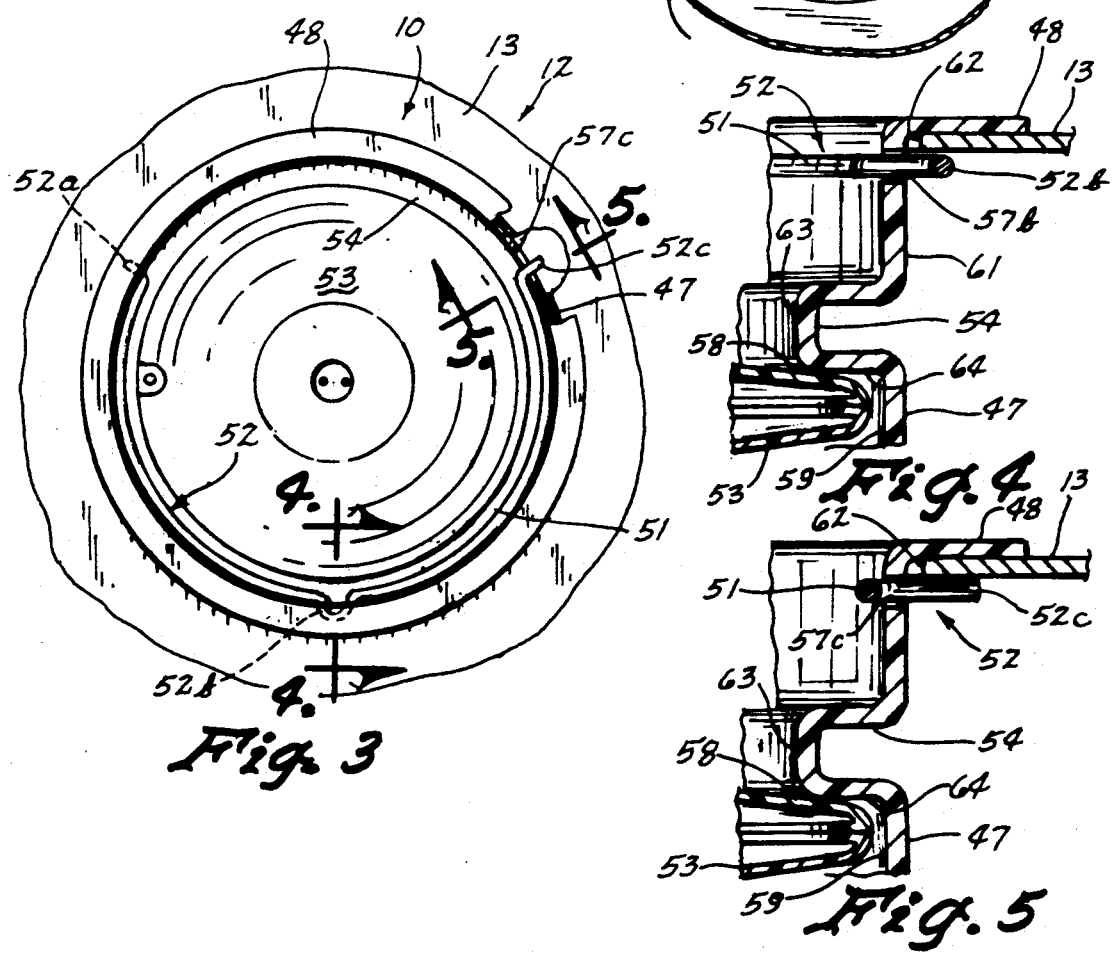

ANIMAL WATERER DRINKING WELL APPARATUS

TECHNICAL FIELD

The present invention relates generally to animal waterers, and more particularly to an Animal Waterer Drinking Well Apparatus.

BACKGROUND ART

The provision of an effective waterer for ensuring drinkable water to livestock under all climatic conditions is imperative to the farmer. To the fulfillment of this requirement for the growth of domestic farm animals and the economic health of cattle and hog raisers, this invention is directed.

In the construction of animal waters wherein the top cover is of sheet metal, hard plastic or the like, circular openings are normally formed for the insertion therein of drinking tubes or wells into which animals learn to insert their mounts in order to drink the water within the well. Contemporary means of fastening or otherwise securing the well to the cover comprise metal screws or like fasteners usually securing an annular lip or flange formed at the top of the well to an adjacent, contiguous portion of the cover.

Whereas this type of fastening is effective for a period of time, due to the extreme varying climatic conditions of use of waterers of this type, such fastenings tend to deteriorate and become otherwise unsatisfactory for their intended purpose.

Further utilization of such animal waterers involves a freely floating valve within the drinking cups or wells developed to provide an inexpensive and energy efficient waterer. A persistent problem with such freely floating valves, however, is the potential exposure of drinking water within the drinking wells, thus creating an opportunity for ice formation about the valves, which can inhibit continuous availability of water to the animals.

DISCLOSURE OF THE INVENTION

It is, therefore, a primary objective of the present invention to provide a livestock watering apparatus, including a novel drinking well which will obviate the contemporary fastening means for cover mounted drinking wells and with a concomitant integral provision for an annular seal with the floating valve, thus also obviating open water about the periphery of the said valve.

The objective is attained by the formation of a trio of annularly spaced slotted openings about the upper peripheral wall of a well, and spaced slightly below an outwardly extending lip of the well, with a flexible ring having a trio of arcuately spaced projections insertable into the slotted openings to thereby embraceably engage the circumferential edge of a circular opening formed in the waterer cover to receive the drinking well.

The objective is attained secondly by the drinking well wall also having an annular inwardly extended collar formed therein below the slotted openings for forming an overlying seat for the floating valve pushed upwardly by water within the well, whereby to form an effective fluid seal.

Another object of this invention is to provide a livestock watering apparatus which will permit animals to obtain a drink at all times and under all temperature conditions, and which enables each drinking well to be readily removed, if necessary, for servicing.

Still another object of this invention is to provide apparatus as aforesaid which is simple in construction, reliable in operation, and relatively maintenance free.

BRIEF DESCRIPTION OF THE DRAWINGS

These and other attributes of the invention will become more clear upon making a thorough review and study of the following description of a preferred embodiment, particularly when reviewed in conjunction with the drawings, wherein:

Fig. 1 is a perspective view showing the animal waterer of the present invention;

FIG. 2 is an enlarged exploded view of the drinking well apparatus of this invention in conjunction with a fragmentary portion of the waterer cover;

FIG. 3 is a further enlarged plan View of the drinking well apparatus as taken along the line 3—3 of FIG. 1;

FIGS. 4 and 5 are still further enlarged, fragmentary sectional views as taken along the lines 4—4 and 5—5 in FIG. 3;

BEST MODE FOR CARRYING OUT THE INVENTION

Figure 6:
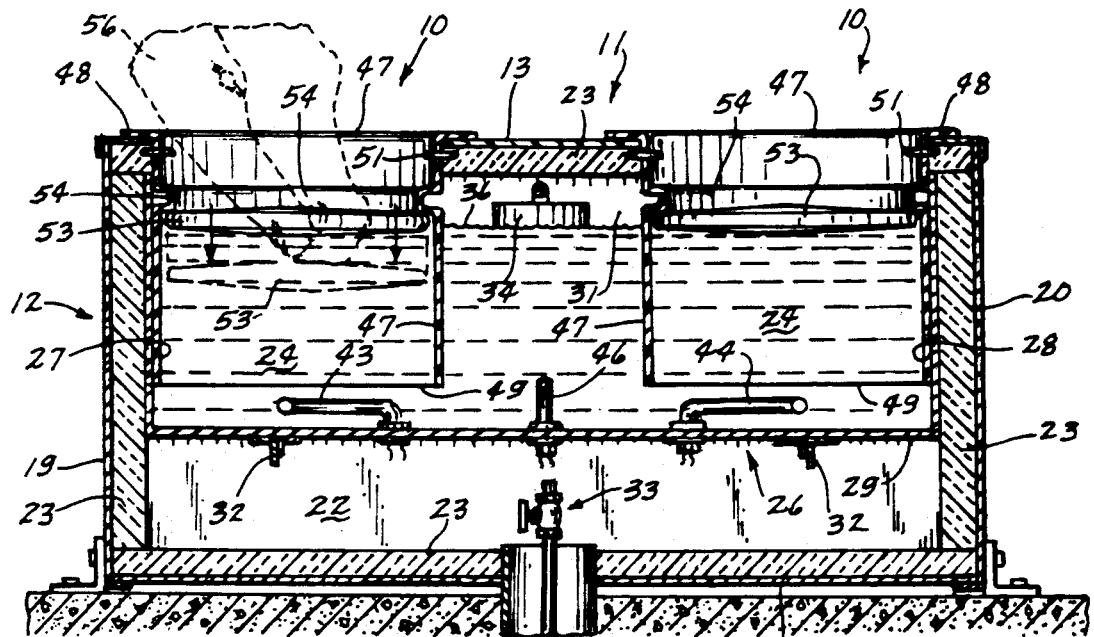
FIG. 6 is a sectional view taken along the lines 6—6 in FIG. 1.

Referring now to the drawings, the drinking well apparatus of this invention is indicated generally at (10), and is shown as part of an animal waterer indicated generally at (11) which comprises in addition to a pair of apparatus (10), a container (12) having a top cover (13) having at least one, but in this instance a pair of circular openings (14) formed therein in spaced relation, each opening (14) adapted to have inserted therein a drinking well apparatus (10).

The container (12) comprises, in addition to the top cover (13), a front panel (16) (FIG. 1) with a maintenance door (17) and opening (18), a pair of side panels (19), (20), a bottom (21), and a rear panel (not shown) for enclosing an interior chamber (22). These elements can be constructed of a durable, workable material such as galvanized sheet steel or similar material that can withstand the abuse of both weather and farm animals. As shown in FIGS. 1 and 6, the top cover (13) is designed to be securely affixed to the upper periphery of the container (12) in order to remain firmly in place under all climatic conditions to protect, with the sides, front and rear panels, the interior (22) of the container (12) to ensure a continued supply of water to the farm animals.

To help protect the interior of the housing against freezing, a lining of insulation (23) is adhered to all interior surfaces of the cover (13) and all panels (16), (19), (20) and the bottom (21). The insulation normally is a styrofoam or like product of a low density plastic and can be several inches thick.

For the purpose of holding water (24) (FIG. 6) within the container (12) a box-shaped trough (26) open at the top is inserted into the upper area of the container (12); and with end walls (27), (28), a bottom wall (29), and side walls (31), only one showing, a water tight trough (26) for holding a constant supply of water (24) is provided. Brackets (32) secured at each end to the container front and rear panels extend across the container chamber (22) for supporting the trough (26). The latter may be constructed of hard plastic, galvanized steel or the like for containing the water (24).

Figure 7:
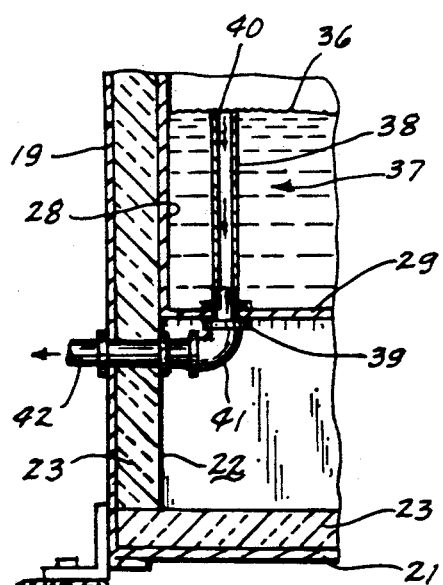
FIG. 7 is a fragmentary sectional view as seen along the lines 7—7 in FIG. 1.

Water is supplied to and regulated within the water (11) by conventional means not a part of this invention. For example, as best shown in FIGS. 6 and 7, water enters the container (12) by an outside supply (33) through the bottom (21) and extends by known means into the trough (26). A standard valve float (34) is employed and is regulated by a standard valve (not shown) referenced in U.S. Pat. No. 4,646,687 issued Mar. 3, 1987 to Jerry D. Peterson et al. Water (24) will enter the trough (26) to a predetermined level (36), such that the valve float (34) is then operable relative to the valve to effect a cessation of the flow of water within the trough (26). An overflow regulator (37) (FIG. 7) is illustrated for carrying off excess water from the trough (26). The regulator (37) comprises an upstanding pipe (38), a coupler (39) secured to the bottom (21) of the container (12), an elbow (41) and a drain tube (42). The upper end (43) of the pipe (38) is set at a predetermined height within the trough (26) to define the maximum water level. If water exceeds that level, it flows into the open upper end (40) and outwardly of the drain tube (42).

Heating elements (43), (44) may be mounted within the container (12) directly below the trough (26) to add thermal energy to the water as shown in FIG. 6. A thermostat (46) monitors the temperature of the water (24) and automatically turns the heating element (43), (44) on and off to maintain the water (24) at a preselected temperature above freezing.

The drinking well apparatus (10), to which this invention is directed, is best shown in FIGS. 1-6 inclusive. The apparatus (10) comprises generally a circular hollow tube (47) having an outwardly extended lip (48) at the upper end thereof and a lower end (49); a flexible, semi-circular ring (51) having a trio of arcuately spaced projections (52) formed therewith; a drink float (53) adapted to be placed on water (24) within the tube (47); and a collar (54) formed integrally within the tube (47) to form with the underlying float (53) a seal with the dual function of permitting an animal (56) (FIG. 6) to drink from within the tube (47) and of otherwise sealing off the water within the tube (47) and the trough (26) from the atmosphere exterior the tube (47).

More particularly, the tube (47), constructed of a hard, durable plastic or like material, has further formed therein a trio of arcuately spaced slots (57) slightly below the lip (48), and which slots (57) are disposed within a plane parallel the plane of the lip (48). Also, it will be noted the collar (54) is a circular and inwardly extended portion integral with the tube (47) and is disposed within a plane below and parallel the plane of the slots (57). The ring (51) may be of metal in the form of a rod and formed further to effect an outwardly directed bias, with the projections (52) extended outwardly as best illustrated in FIG. 3. It will further be noted the ring (51) and projections (52) are all disposed within a single plane.

The drink float (53) is constructed of a buoyant insulation such as two sheets of hard plastic, joined together and sealed around the edges to form a cavity (not shown). The drink float (53) is a circular, flat disk having a relatively flat upper peripheral surface (58), the peripheral edge of which is disposed closely adjacent the circular wall (59) of the tube (47).

In assembly and operation, the hollow tube (47) is inserted within a circular cover opening (14), the outer diameter (61) (FIG. 4) of the tube (47) being slightly less than the inner diametrical edge (62) of the opening (14), whereby the tube (47) has a snug fit within the opening (14), and with the lower end (49) disposed within the water (25) in the trough (26). The three slots (57(a), 57(b), 57(c)) (FIG. 2) are located a preselected distance below the lip (48) substantially equal to the thickness of the cover (13), such that, with the arcuate spacing of the slots (57(a), 57(b), 57(c)) substantially equal the arcuate spacing of the three projections (52(a), 52(b), 52(c), upon insertion of the ring (51) within the hollow tube (47), each respective projection, (52(a)) for example, extends through its mating slot (57(a)), with the other projections likewise extending through their respective slots as best illustrated in FIG. 3, all three projections (52(a), 52(b), 52(c)) extend in a contiguous relationship directly below and with the circular opening edge (62).

It will be readily seen that by this arrangement, with the flexible ring (51) in place and biased outwardly such as to force the projections (52) through their respective slots (57), and with the projections (52) combining with the lip (48) to embrace the cover opening edge (62), the tube (47) is securely fixed in place on the cover (13) and within the trough (26). To remove the tube (47) from its opening (14), one merely grasps the ring (51) within tube (47), bending the flexible ring (51) inwardly against its normal bias to remove the projections (52) from their slots (57), and then lifting out the tube (47).

To minimize the loss of thermal energy of the water to the atmosphere at the water surface within the tube (47) FIG. 6, the drink float (53), having a diameter less than the inner diameter of the tube (47) but greater than the inner diameter (63) of the collar (54), the normal water level (36) within the tube—which is the same as the regulated water level (36) within the container (12), provides an upward force on the drink float (53) of a sufficient value for the upper peripheral surface (58) (FIG. 5) to engage and seal against the lower collar surface (64). By this arrangement, heat loss to the atmosphere is minimized.

An animal (56) (FIG. 6) seeking a drink will place its mouth within one of the tubes (47) and push down on the drink float (53), dislodging the seal and forcing the float (53) downwardly into the water (24). After the animal (56) drinking its fill and removing its mouth from the tube (47), the submerged portion of the buoyant drink float (53) will return to its position on the surface of the water (24). With the regulated water (24) returning to its normal level (36), the underlying drink float (53) will again seat upwardly against the collar (54) to form the seal, thus fulfilling the objectives of the invention.

I claim:

1. In an animal waterer including a container, the container having a cover with at least one opening formed therein leaving a circumferential cover edge about the opening, the container holding water therein at a regulated level, the improvement comprising a drinking well apparatus comprising:

tubular means forming a hollow tube having an outwardly extended lip at an upper end thereof, said tubular means adapted to be inserted into the at least one opening whereby said lip overlies the cover edge, said tubular means having a wall with a plurality of slots formed therein below said lip;

flexible ring means adapted to be inserted within said tubular means and against said wall, said ring means having a plurality of projections integral therewith, each projection insertable through one of said slots whereby to extend below the cover edge to secure thereby the tubular means to the cover;

a float having a periphery with a relatively flat upper surface adapted to be placed within said tubular means with the periphery closely adjacent said wall; and collar means formed within said tubular means below said slots and having a lower peripheral surface engageable with said float upper surface and forming thereby a fluid seal.

2. The invention of claim 1, and wherein said tubular means comprises a circular hollow tube.

3. The invention of claim 2, and further wherein said slots are arcuately spaced within a plane parallel the plane of said lip.

4. The invention of claim 3, and further wherein said ring projections extend outwardly; and further wherein said collar extends within a plane parallel the plane of said lip.

5. The invention of claim 1, and wherein said flexible ring means comprises a semi-circular ring.

6. The invention of claim 5, and further wherein said ring projections extend outwardly.

7. The invention of claim 1, and further wherein said collar means comprises a circular, inwardly extended collar.

8. The invention of claim 7, and further wherein said collar extends within a plane parallel the plane of said lip.

* * * * *